United States Patent
Radermacher

(10) Patent No.: US 9,258,868 B2
(45) Date of Patent: Feb. 9, 2016

(54) DRIVER DEVICE AND DRIVING METHOD FOR DRIVING A LOAD, IN PARTICULAR AN LED ASSEMBLY

(75) Inventor: Harald Josef Günther Radermacher, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 162 days.

(21) Appl. No.: 14/009,118

(22) PCT Filed: Mar. 28, 2012

(86) PCT No.: PCT/IB2012/051470
§ 371 (c)(1),
(2), (4) Date: Oct. 1, 2013

(87) PCT Pub. No.: WO2012/137103
PCT Pub. Date: Oct. 11, 2012

(65) Prior Publication Data
US 2014/0015441 A1    Jan. 16, 2014

(30) Foreign Application Priority Data

Apr. 8, 2011 (EP) .................................... 11161748

(51) Int. Cl.
*H05B 37/02* (2006.01)
*H05B 33/08* (2006.01)
(52) U.S. Cl.
CPC ............ *H05B 37/02* (2013.01); *H05B 33/0809* (2013.01); *H05B 33/0824* (2013.01)
(58) Field of Classification Search
CPC ...... H05B 37/02; H05B 33/08; H05B 33/083; H05B 33/0815; H05B 33/0824
USPC ............. 315/122, 123, 185 R, 192, 193, 291, 315/294, 307, 312
See application file for complete search history.

(56) References Cited

U.S. PATENT DOCUMENTS

| 5,663,719 A | 9/1997 | Deese et al. |
| 6,989,807 B2 | 1/2006 | Chiang |
| 7,081,722 B1 | 7/2006 | Huynh et al. |

(Continued)

FOREIGN PATENT DOCUMENTS

| WO | 03107722 A2 | 12/2003 |
| WO | 2010027254 A1 | 3/2010 |

(Continued)

*Primary Examiner* — Thai Pham

(57) ABSTRACT

Driver device (1) and a corresponding driving method for driving a load (100), in particular an LED assembly comprising two or more LEDs. The proposed driver device comprises supply terminals (10) for receiving a supply voltage (Vs), load terminals (20) for coupling a load to said driver device and for providing electrical energy to said load for driving said load, a storage unit (40) for storing electrical energy received at said supply terminals, a coupling unit (50) coupled between said supply terminals and said storage unit for controllably providing electrical energy from said supply terminals to said storage unit, a first switching unit (60) coupled between said supply terminals and said load for switchably providing electrical energy from said supply terminals to one or more of said load terminals, a second switching unit (70) coupled between said storage unit and said load for switchably providing electrical energy stored in said storage unit to one or more of said load terminals, and a control unit (80) for controlling said coupling unit and said first and second switching units.

20 Claims, 6 Drawing Sheets

(56) References Cited

U.S. PATENT DOCUMENTS

| | | | |
|---|---|---|---|
| 2003/0230334 A1* | 12/2003 | Chang et al. | 136/244 |
| 2005/0029966 A1 | 2/2005 | Buonocunto | |
| 2008/0094000 A1 | 4/2008 | Yamamoto et al. | |
| 2009/0200953 A1* | 8/2009 | King | 315/209 R |
| 2010/0013173 A1 | 1/2010 | Klank et al. | |
| 2010/0134018 A1* | 6/2010 | Tziony et al. | 315/122 |
| 2011/0248640 A1* | 10/2011 | Welten | 315/210 |
| 2014/0239832 A1* | 8/2014 | Shteynberg et al. | 315/201 |

FOREIGN PATENT DOCUMENTS

| | | |
|---|---|---|
| WO | 2011141856 A1 | 11/2011 |
| WO | 2012085800 A1 | 6/2012 |

* cited by examiner

DRIVER DEVICE AND DRIVING METHOD FOR DRIVING A LOAD, IN PARTICULAR AN LED ASSEMBLY

FIELD OF THE INVENTION

The present invention relates to a driver device and a corresponding driving method for driving a load, in particular an LED assembly comprising two or more LEDs. Further, the present invention relates to a lighting apparatus.

BACKGROUND OF THE INVENTION

In Solid State Lighting (SSL), i.e. in general illumination, the relative cost contribution of the driver is expected to increase due to the decrease in Light Emitting Diode (LED) cost. Hence, in order to reduce the cost of the total system, also the driver has to become cheaper (in particular simpler and/or smaller) A closer linkage between LED and driver will still enable high performance.

When operating LEDs from a power supply, e.g. a mains voltage supply, both the electrical input waveform and the optical output waveform have to fulfill certain criteria. This holds not only for High Voltage (HV) LEDS, but the same structure may be used for with e.g. 5 low voltage LEDs in a 12V halogen replacement system, and also with e.g. 100 low voltage LEDs and mains voltage. With a Tapped Linear Driver (TLD) as e.g. described in U.S. Pat. No. 6,989,807 B2, U.S. Pat. No. 7,081,722 B1 or US 2008/0094000 A1, a method was proposed that adjusts the length of the LED string, in particular by means of shunting or bypassing these LEDs that are not to be powered from the power supply, dynamically in order to let the LED string voltage follow the wave shape/elongation of the AC supply voltage.

With this method, there is still a direct coupling between the electrical input and the optical output waveform, so influencing (reducing) the flicker or stroboscopic artifact in light will impact the input harmonics. To fulfill the various mains voltage regulations (representing a certain combination of wave shape, harmonics and power factor), a better decoupling between the electrical waveform on the input and the optical output waveform of the light is required.

SUMMARY OF THE INVENTION

It is an object of the present invention to provide a driver device and a corresponding driving method for driving a load, in particular an LED assembly comprising two or more LEDs by which various mains voltage regulations can be fulfilled and which provide a better decoupling between the electrical waveform on the input and the output waveform at the output.

In a first aspect of the present invention a driver device is presented comprising
   supply terminals for receiving a supply voltage,
   load terminals for coupling a load to said driver device and for providing electrical energy to said load for driving said load,
   a storage unit for storing electrical energy received at said supply terminals,
   a coupling unit coupled between said supply terminals and said storage unit for controllably providing electrical energy from said supply terminals to said storage unit,
   a first switching unit coupled between said supply terminals and said load for switchably providing electrical energy from said supply terminals to one or more of said load terminals,
   a second switching unit coupled between said storage unit and said load for switchably providing electrical energy stored in said storage unit to one or more of said load terminals, and
   a control unit for controlling said coupling unit and said first and second switching units.

In a further aspect of the present invention a corresponding driving method is presented comprising the steps of
   receiving a supply voltage,
   providing electrical energy to said load for driving said load through load terminals,
   storing electrical energy received through said supply voltage in a storage unit,
   controllably providing electrical energy to said storage unit,
   switchably providing electrical energy from said supply terminals to one or more of said load terminals,
   switchably providing electrical energy stored in said storage unit to one or more of said load terminals, and
   controlling said steps of providing electrical energy to said storage unit and said load.

Still further, according to another aspect of the present invention a lighting apparatus comprising a light unit, in particular an LED assembly comprising two or more LEDs, and a driver device according to the present invention coupled to said light unit for driving said light unit.

Preferred embodiments of the invention are defined in the dependent claims. It shall be understood that the claimed method and the claimed lighting apparatus have similar and/or identical preferred embodiments as the claimed device and as defined in the dependent claims.

The present invention is based on the idea to provide two separate output power ports (i.e. at least three load terminals, wherein one load terminal may belong to two different output power ports) for coupling the load to the driver device. One power port is provided at the supply terminals to provide electrical energy to the load directly from the supply terminals, i.e. directly from the supply voltage (eventually after rectification, if needed). Another power port is provided at the storage unit (e.g. a capacitive storage unit including one or more capacitors) providing electrical energy to the load stored in the storage unit. Thus, the proposed driver device is designed for independent power delivery to a load, in particular to the same, different or overlapping parts of the load (e.g. different segments of an LED string). This allows controlling the amount of current supplied at the supply terminals (e.g. from a mains voltage source) and the storage unit to the load independent of each other. As a result, it is easier to tune the input current waveform towards specific regulatory requirements, such as harmonics limits of country specific regulatory requirements.

It shall be noted here that the proposed driver device generally receives as input a supply voltage, which can be provided by any pre-processing unit (such as a transformer, inverter or dimmer) which converts an AC mains voltage (or any other available voltage) into the required supply voltage. The supply voltage may be a rectified voltage or an AC supply voltage, and the pre-processing means may even include initial steps of the power signal processing, such as means for rectifying, and may hence deliver a rectified voltage to the proposed driver device. It may, of course, also be possible to directly use an available AC mains voltage as AC supply voltage if it fulfils the criteria for being used as input for the driver device, which is often the case. Hence, wherever "supply voltage" is mentioned herein, it may also be understood in certain conditions as "mains voltage" or, in other embodiments, as "dimmed mains voltage" or as rectified AC voltage.

Furthermore, the supply voltage may, in some embodiments, even be a DC voltage as e.g. provided by a battery or a rectifier and a smoothing capacitor.

According to a preferred embodiment said second switching unit is configured to switchably provide electrical energy from one or more of said load terminals to said storage unit. This enables that the storage unit can be charged not only from the supply terminals but also from the load, i.e. part of the electrical energy provided from the supply terminals through the first switching unit to the load, which is not consumed by the load or not needed by the load can thus be "forwarded" to the storage unit through the second switching unit.

For this purposed the second switching unit preferably comprises bidirectional switches, in particular bidirectional current limited switches. Preferably, the current limit value can be set dynamically to any desired value during operation. These and other switches (generally called switching elements, which may be unidirectional or bidirectional) used in other switching units can generally be implemented by transistors or diodes, such as NMOS or PMOS transistors. Further, also (unswitched) current sources may be used and understood as switching element in the context of the present application.

In another embodiment said coupling unit and/or said first and/or second switching unit comprises limiting means for limiting the current, voltage and/or electrical power provided through the respective unit, e.g. the switching means of the respective switching unit (also the coupling unit may include such switching means and may, in an embodiment, effectively be another switching unit). Such a limiting means may include a current source for limiting the current. Other limiting means may include resistors, (unswitched) current sources or other known elements for limiting current, voltage and/or power. These limiting means enable the control of the amount of electrical energy provided through the respective units (i.e. coupling unit or first/second switching unit).

In a preferred embodiment said control unit is configured to control said first and second switching units to switchably provide electrical energy to said load according to one or more predetermined criteria, in particular including efficiency, power factor, current waveform, homogenous stress of the different segments within the load and/or flatness in light output in case of a light unit as load. Thus, the control can be made according to a desired control strategy, which may be selected in advance to fulfil certain desired criteria, e.g. certain regulations prescribed in the respective country of use.

Advantageously, said first and/or second switching unit comprises current measuring elements, in particular shunt resistors, for measuring the current provided through an associated switching element of the respective switching unit and said control unit is configured to control said first and second switching units to switchably provide electrical energy to said load to balance the total power and the power distribution. This includes to control the current in a analogue way, e.g. in combination with the measured value. In this way it is possible, when using the invention for driving a light unit, to have a smooth flux and homogenous light output from the light unit.

Preferably, said storage unit comprises two storage output terminals and said second switching unit comprises switching elements for independently switching said two storage output terminals to two load terminals. This embodiment enables a more flexible power supply to the desired part of the load, e.g. to provide electrical energy from the storage unit to one or more desired segments of a light unit (e.g. an LED string).

In an embodiment the proposed driver device further comprises a rectifier unit coupled to said supply terminals for rectifying a received AC supply voltage. Preferably, said rectifier unit and said storage unit have a common reference terminal coupled to one of said load terminals, leading to less required switching elements.

Still further, in an embodiment said rectifier unit comprises two rectifier output terminals and said second switching unit comprises switching elements for independently switching said two rectifier output terminals to two load terminals. Similarly as explained above this embodiment provides more flexibility in providing electrical energy from the rectifier unit to a desired part of the load, e.g. to provide electrical energy from the rectifier unit to one or more desired segments of a light unit (e.g. an LED string).

In an embodiment said control unit is configured control said first and second switching units such that electrical energy is provided from said storage unit to a first part of said load and that electrical energy is provided from said supply terminals (or, if provided, said rectifier unit) to a second part of said load and that the providing of electrical energy to said first or second parts is adapted according to the amount of electrical power that is currently taken from the supply terminals. Thus, a flexible power supply of the load is easily achievable.

While as storage unit any unit may be used by which electrical energy can be stored for delivery to the load when needed, in a preferred embodiment said storage unit includes a capacitive storage unit, in particular including one or more capacitors.

In an embodiment the control is focussed on the power input from a mains power supply unit. At the same time, the power (voltage) of the storage unit is kept in mind because of the efficient recharging. In addition, the control is preferably focussing on the power that can be provided by the supply terminals without creating too many harmonics. Generally, it shall not be consumed as much energy as can be delivered at the supply terminals, but the power shall efficiently be provided to the load by the storage unit and the external power supply.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
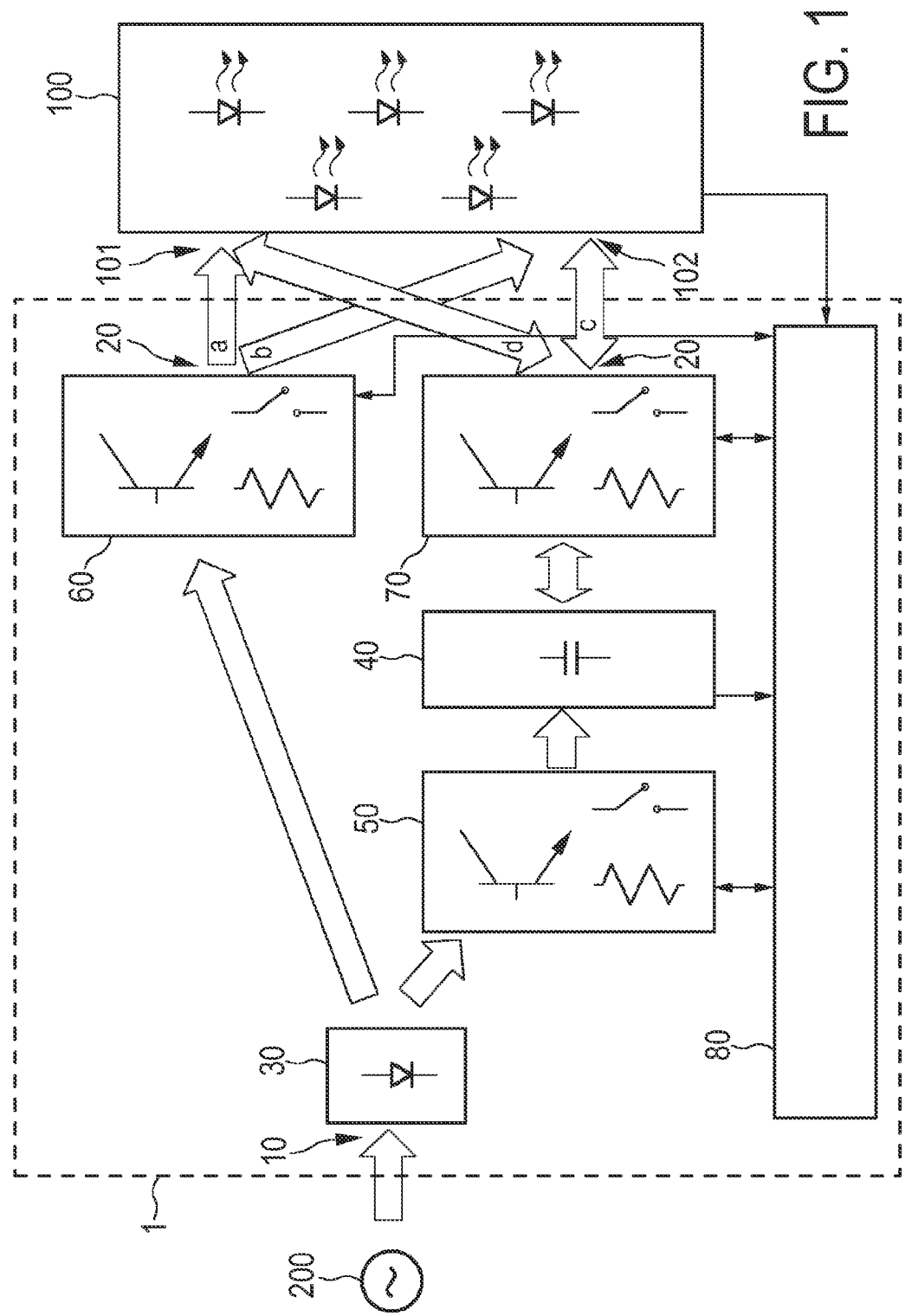
FIG. 1 shows a schematic block diagram of the general layout of a proposed driver device according to the present invention.

FIG. 1 shows a schematic block diagram of the general layout of a proposed driver device 1 according to the present invention. Said driver device 1 is provided for driving a load 100, which is a light unit 100 comprising a number of LEDs in this embodiment, together representing a lighting apparatus. The driver device 1 is provided with an AC mains voltage from a mains voltage supply 200 in this embodiment.

The driver device 1 comprises supply terminals 10 for receiving the provided AC supply voltage $V_S$ from the mains voltage supply 200 and load terminals 20 for coupling the load 100 to said driver device 1 and for providing electrical energy to said load 100 for driving said load 100. In a rectifier unit 30 (possibly also including generally known means for filtering and protection) the received AC supply voltage $V_S$ is rectified. The rectified supply voltage is then provided on the one hand to a coupling unit 50 coupled between said rectifier unit 30 and storage unit 40, e.g. including a capacitor, for switchably providing electrical energy from said rectifier unit 30 to said storage unit 40. In said storage unit 40 electrical energy provided by said rectifier unit is stored. On the other hand, the rectified supply voltage is provided to a first switching unit 60 coupled between said rectifier unit 30 and said load 100 for switchably providing electrical energy from said rectifier unit 30 to one or more of said load terminals 20. A second switching unit 70 coupled between said storage unit 40 and said load 100 is provided for switchably providing electrical energy stored in said storage unit 40 to one or more of said load terminals 20, which may be the same or (partly or completely) other load terminals than the load terminals 20. Finally, a control unit 80 is provided for controlling said coupling unit 50 and said first and second switching units 60, 70. The control unit might also be provided with measuring means to measure some status information, such as (but not limited to) the input voltage and/or current, the storage voltage and/or current and/or the load configuration, temperature and/or flux.

As shown in FIG. 1, the electrical energy from the rectifier unit 30 may be delivered via the first switching unit 60 to a first port 101 of the load 100 (path a) and to a second port 102 of the load 100 (path b). Similarly, the electrical energy stored in the storage unit 40 may also be delivered via the second switching unit 70 to the first port 101 of the load 100 (path d) and to the second port 102 of the load 100 (path c). These deliveries of electrical energy are, according to the present invention, possible completely independent from each other. While the paths a and b are generally unidirectional from the first switching unit 60 to the load 100, the energy flow on paths c and d may be bidirectional, i.e. the storage unit 40 may be charged via the second switching unit 70 via energy delivered via the load 100. Typically, the load 100 will not be able to store or generate electrical energy, so the energy received by the storage unit 40 and the second switching unit 70 via paths c and d from the load 100 is typically delivered at the same time to the load 100 from the input terminals 10 via the load terminals 20 and via paths a or b.

Figure 2:
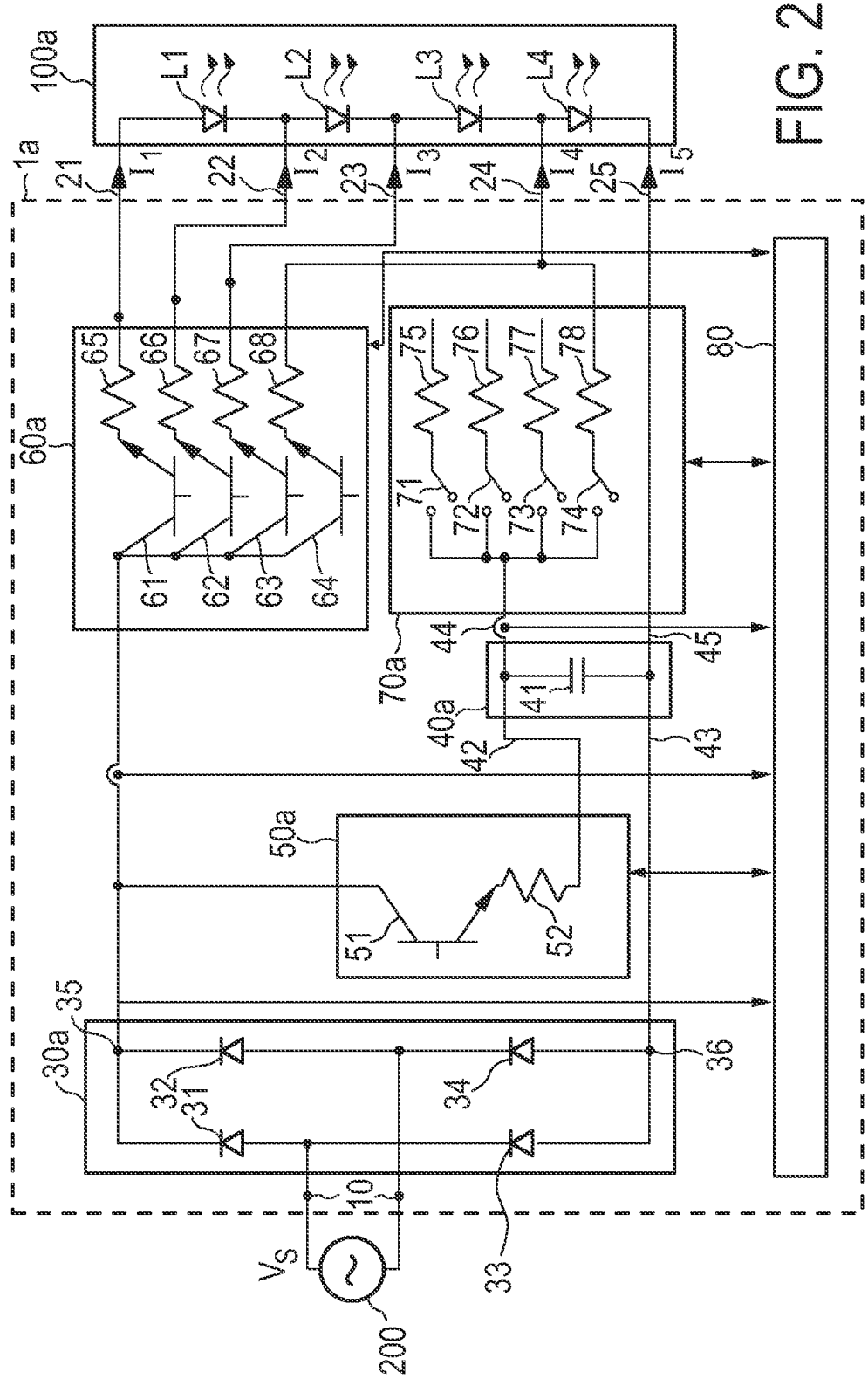
FIG. 2 shows a schematic block diagram of a first embodiment of the driver device according to the present invention.

FIG. 2 shows a schematic block diagram of a first embodiment of the driver device 1a according to the present invention. In this embodiment, the load 100a comprises four LED segments L1, L2, L3, L4. The rectifier unit 30a comprises a conventional full bridge rectifier of four diodes 31, 32, 33, 34 coupled as a full bridge. The capacitive storage unit 40a comprises a single capacitor 41 coupled between storage input terminals 42, 43 and storage output terminals 44, 45. The coupling unit 50a coupled to the first rectifier output terminal 35 of two rectifier output terminals 35, 36 comprises a transistor 51 and a resistor 52 together forming a current limited switch. The resistor 52 is coupled between the transistor 51 and the first storage input terminal 42.

The first switching unit 60a comprises four current limited switches, each formed by a series coupling of a transistor 61, 62, 63, 64 and a resistor 65, 66, 67, 68. The first terminals of the transistors 61, 62, 63, 64 are coupled to the first rectifier output terminal 35. The second terminal of the resistors 65, 66, 67, 68 represent four output terminals. In this way the rectified supply voltage can be switched to a desired load terminal of the four load terminals 21, 22, 23, 24. The fifth load terminal 25 represents a reference terminal and is coupled to the second rectifier output terminal 36 and the second storage output terminal 45. Since the current limited switches of the first switching unit 60a are unidirectional switches current flow is only from the rectifier unit 30a to the load 100a.

Quite similarly, the second switching unit 70a also comprises four current limited switches, represented in the figure by a series coupling of a switch 71, 72, 73, 74 and a resistor 75, 76, 77, 78. The first terminals of the switches 71, 72, 73, 74 are coupled to the first storage output terminal 44. The second terminal of the resistors 75, 76, 77, 78 represent four output terminals which are coupled together with the output terminals of the first switching unit 60a, i.e. one of the output terminals of the second switching unit 70a is connected to one of the output terminals of the first switching unit 60a. In this way the capacitor voltage stored in the capacitor 41 can be switched to a desired load terminal of the four load terminals 21, 22, 23, 24. Since the current limited switches of the second switching unit 70a are preferably bidirectional switches (but could also be unidirectional switches) current can both flow from the capacitor 41 to the load 100a and from the load 100a to the capacitor 41.

During the supply voltage cycle, the following activation scheme is used in an embodiment. During the zero crossing of the supply voltage, the capacitor 41 supplies the load 100a (switch state of the switches 71-74 depend on capacitor voltage). When the supply voltage is higher than the first segment voltage over the first segment (the LED L4) of the load 100a, the switch 64 is activated and the LED L4 is driven off the supply voltage. Still, the remaining part of the LED string is generally supplied from the capacitor 41 (with another embodiment described below the capacitor 41 is switched to supply L1 to L3 then, to have an even distribution of power and light).

When the supply voltage is higher than two segment voltages, the switch 64 is turned off and the switch 63 is turned on to drive L3 and L4. Assuming the capacitor 41 has been discharged to a similar voltage and the switch 51 is activated, now the recharge of the capacitor 41 may start.

In a sequence, now more and more segments are operated and the capacitor 41 is recharged. During this interval, the supply voltage and the capacitor voltage are quite the same. In case mains harmonics/THD regulation require, at any point in time the power flow from the rectifier unit 30a to the load 100a can be reduced/stopped and more power can be drawn from the capacitor 41, as long as there is a "compensation interval" to recharge the capacitor 41 again. Alternatively, the charging of the capacitor 41 may be reduced or stopped by setting the coupling unit 50 to a lower current or to no current Via the selection of the control strategy, such a lamp can be tuned towards different criteria, such as best flatness in light output, best efficiency while maintaining a required power factor, special input current waveform for dimmer compatibility, etc.

For the control, multiple aspects can be taken into account. Firstly, the harmonics of the supply current can be taken into account. As described later, it has to fulfill different requirements. Secondly, the control scheme should be symmetric, in order to avoid any 50 Hz components in the light and any sub harmonics or DC component in the input current. Further, minimization of the losses can be a criterion. Closely related to this, also the distribution of losses is of importance. As an example, in FIG. 2, the capacitor 41 can receive a charging current via the coupling unit 50a or via first and second switching units 60a, 70a. In the first case, losses will occur in transistor 51, whereas in the latter case the losses will be shared between transistor 61 and transistor 71. Depending on the realization, i.e. the cooling of the three transistors, one or the other charging path may be preferred in certain modes of operation. Looking at the light output, generally a smooth light output is preferred, in order to avoid optical artifacts, such as flicker and stroboscopic effects. Looking at the cooling and lifetime of the LEDs in the load, equal loading of the segments is desired. All these aspects have to be evaluated carefully for a certain application to derive the suitable control algorithm.

By measuring the currents (e.g. via shunt resistors) delivered from the rectifier unit 30a and from the capacitor 41 to the LED 100a, and knowing the status of the various units 50a, 60a, 70a, the control can balance the total power and distribution, in order to have a smooth flux and homogeneous light emission from the LED assembly 100a.

In the above described embodiment, the LED assembly 100a (comprising four segments coupled in series) is considered fixed and there is one signal/terminal 25 common to the two power sources, i.e. the capacitor 51 and rectifier unit 30a have a common ground.

Figure 3:
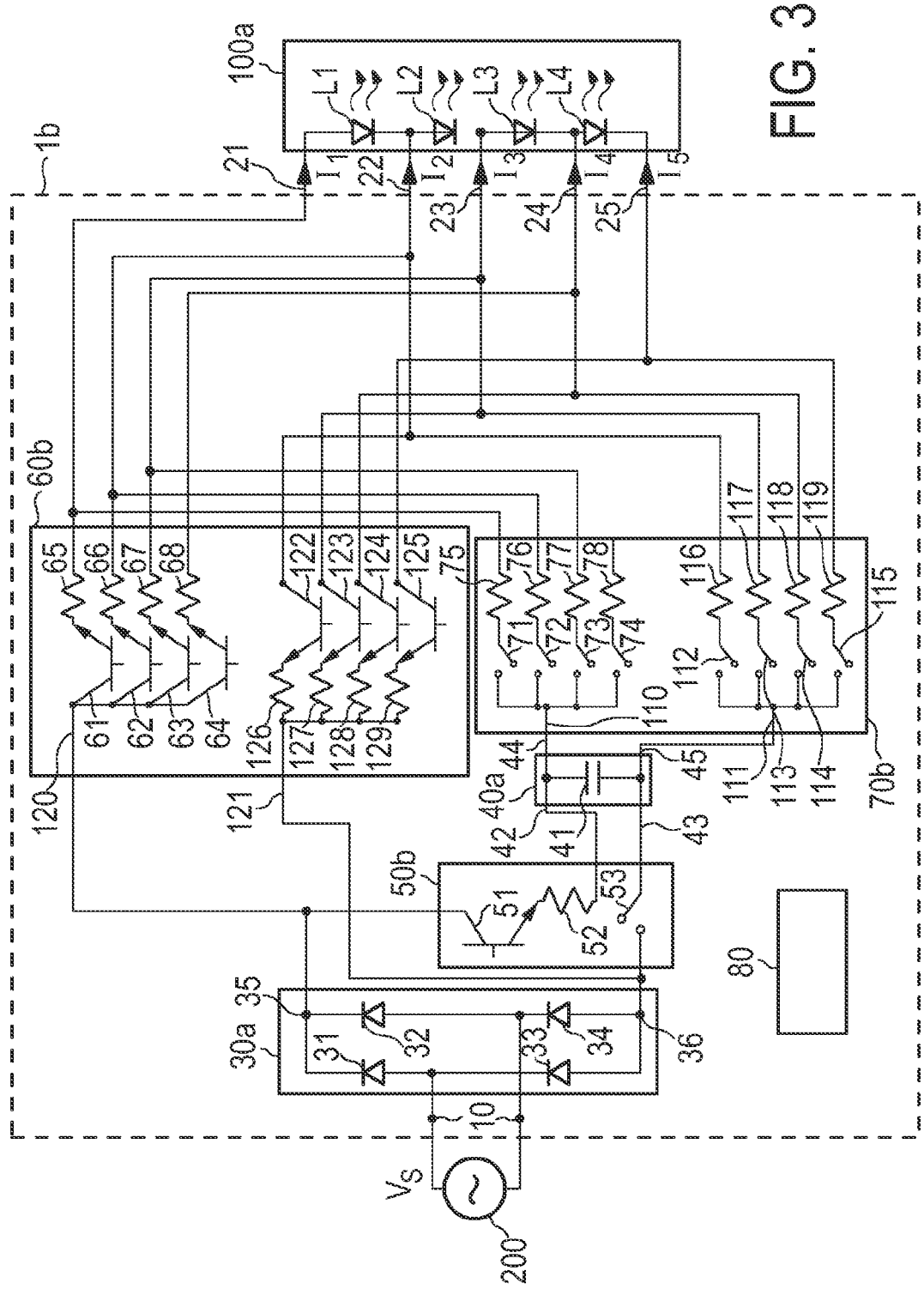
FIG. 3 shows a schematic block diagram of a second embodiment of the driver device according to the present invention.

In another embodiment of the driver device 1b shown in FIG. 3 using the same LED assembly 100a the capacitor 41 can be "floating", meaning that the coupling unit 50b can couple or decouple the two storage inputs 42 and 43 with the supply terminals 10.

Further, the second switching unit 70b has two input terminals 110, 111 and more switching elements formed by switches 112-115 and resistors 116-119 to connect both capacitive output terminals 44, 45 of the capacitor 41 separately to the load 100a. Then, the power from the capacitor 41 can be injected into (or, when charging, extracted from) any suitable combination of load terminals 21-25. Thus, when supplying two LED segments in series, it can be freely chosen to power LED segments L1+L2, L2+L3 or L3+L4 (or other combinations like L1+L2+L3 or L2+L3+L4 in case of three segments). Hence, the losses/brightness can be distributed more evenly.

The same (at least for the injection of power) is also possible with the supply voltage: when using a first switching unit 60b with two input terminals 120, 121 and more switching elements formed by switches 122-125 and resistors 126-129, also the supply power can be delivered to a desired substring of LED segments of the LED assembly 100a.

For simplicity's sake the control lines between the control unit 80 and the various units of the driver device 1b have been omitted.

It shall be noted that generally the configuration of the load (e.g. the LED assembly) is not fixed and need not necessarily comprise a series connection of a plurality of LEDs, but load, e.g. the segments of the LED assembly, can be configured freely (e.g. in series and/or parallel). This will allow more flexible switching schemes and better homogeneity in light output and losses.

In the embodiments shown in FIGS. 2 and 3, the switches in the third switching unit 70a, 70b are preferably bidirectional. This is to some extent redundant, since charging of the capacitor 41 can also be performed via the coupling unit 50a, 50b. Hence, the switch 71 could alternatively be a unidirectional switch. In case the required input and output waveform exclude certain switch combinations, some switches may be combined or replaced by a decoupling diode.

Further, in the embodiments shown in FIGS. 2 and 3 the switches/transistors are sketched with their own resistor for sensing/limiting the current. Instead, some switches may share a common current limitation, as long as it is still possible to control the current from the rectifier unit 30a and the current from the capacitive storage unit 40a.

Figure 4:
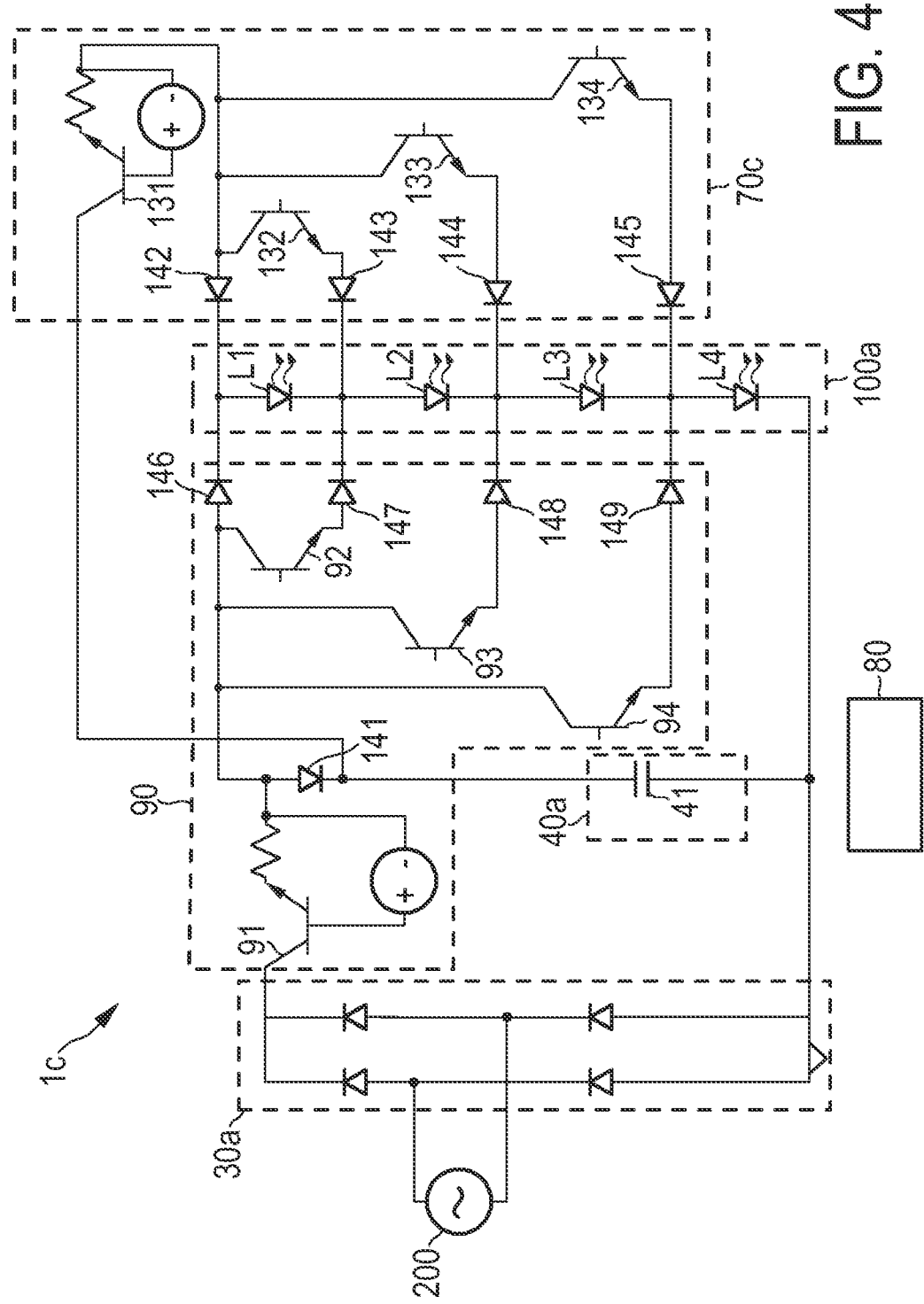
FIG. 4 shows a schematic block diagram of a third embodiment of the driver device according to the present invention.

FIG. 4 shows a schematic block diagram of a third embodiment of a driver device 1c according to the present invention. Analog programming values (such as multiple sine waves of different frequency) are used for best power factor performance. This may be implemented in (the lockup table of) a microcontroller. For a hardwired control implementation, a realization with some analog oscillators would most likely result in high effort for the control loop, so the signal may be derived from a measurement of the supply voltage or may be approximated by a few discrete voltage/current levels.

The parameters of the components used in the driver device can be tuned to fulfill one or more desired criteria, e.g. a high power factor, high efficiency, homogenous stress of the different segments within the load and/or low light flicker. The final design and the parameters are generally based on a balance of harmonics, efficiency and optical performance.

In the embodiment shown in FIG. 4 the components are arranged a bit different compared to the other embodiments shown in FIGS. 2 and 3, in order to ease the control in this simplified case. The coupling unit (50 in FIG. 1) and the first switching unit (60 in FIG. 1) are represented here by a common switching unit 90. The transistor 91 is forming a current source to control the input current; this is equivalent to the combination of current limiting functionality of the above mentioned coupling unit 50 and first switching unit 60. The active charge control of the capacitor 41 is not implemented here, only the total current consumed from the input is controlled. The switching functionality for the supply power is realized by the transistors 92, 93, 94 (and diodes 146-149) on the left side of the LED string 100a comprising four segments. On the right side, the transistor 131 also forms a current source and together with the transistors 132 to 134 (and diodes 142-145) represent the main elements of the second switching unit 70 between the capacitor 41 and the LED string 100a. Effectively, the length of the LED string 100a is independently adjusted for the rectifier and the capacitor power input.

To provide an example, the capacitor 41 has been charged during the peak of the supply voltage. Discharge via the driver on the left side of the load is blocked by diode 141. Subsequently, the supply voltage decreases and only the lowest two segments of the load are powered via transistors 91 and 93. Initially, the energy of the fully charged capacitor 41 can be used to power all segments of the load 100a via transistor 131 and diode 142. While the capacitor 41 is discharged, transistor 132 may be used to direct the power from the capacitor 41 to the lowest three segments, and so on. Obviously, the lower segments of the load will receive (on average) more power than the upper segments. This is a limitation of this simplified embodiment in FIG. 4, that can be overcome by the embodiment described above with reference to FIG. 3.

The transistor 91 receives a signal composed of harmonics of the supply voltage frequency. The transistor 131 receives a command based on the comparison between desired LED power and the power currently from rectifier unit 30a into the LED string 100a.

The input current is programmed (via the drive signal for the transistor 91) to have a predefined shape, basically incorporating fundamental, third and fifth components up to the level of harmonic distortion or power factor allowed in the specific application. This limit will typically be defined by standards (like the IEC61000-3-2) for certain countries, by additional requirements from certification labels (like Energy star), etc. Since these requirements are different for different applications (countries, type of lamp or module, power level), the best implementation of waveform is determined by a trade-off between the relevant criteria and conditions. The fundamental wave and the third and fifth harmonics used here represent a mere non-limiting example.

The amount of supply current that is still available after charging the capacitor 41 is fed to the appropriate tap of the LED string 100a. This power is monitored and compared to a reference signal. The error signal drives the second current source 131, controlling the power delivery from the capacitor 41 to the LED string 100a. Depending on the voltage of the capacitor 41, this current is fed to the appropriate tap of the LED string 100a.

Figure 5A:
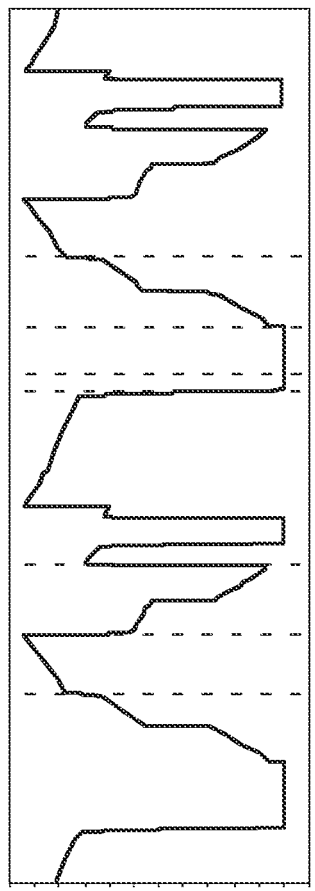
FIG. 5 shows signal diagrams illustrating exemplary signal sequences of various signals in a driver device according to the present invention.
Figure 5B:
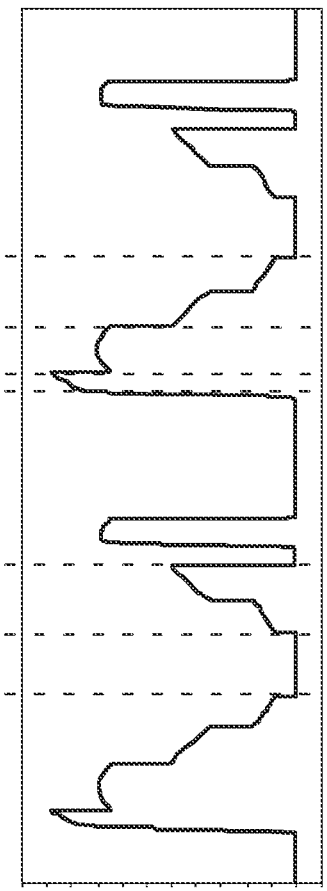
Figure 5C:
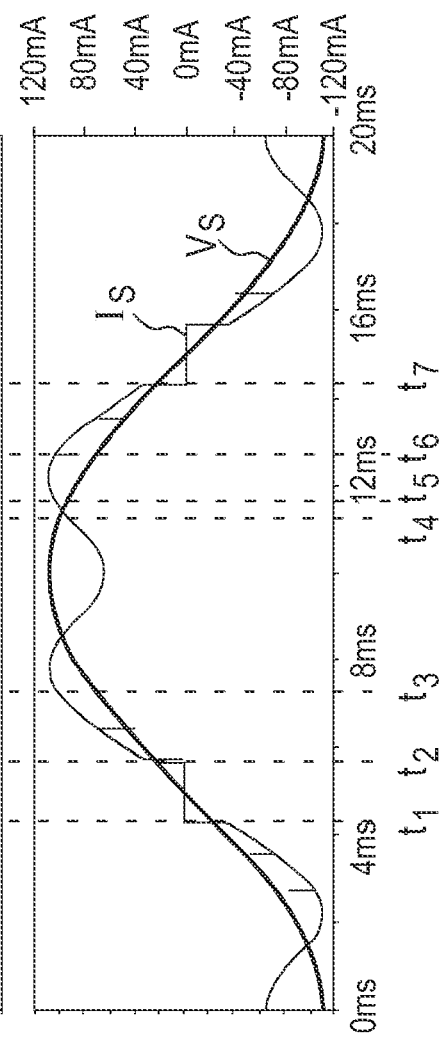

Some waveforms are shown in FIG. 5. FIG. 5A shows the power delivered from capacitor 41 to the LED string 100a. FIG. 5B shows the power delivered from the rectifier unit 30c to the LED string 100a. FIG. 5C shows the supply voltage $V_S$ and the supply current $I_S$.

From t1 to t2 the supply voltage is lower than the lowest tap voltage so that no voltage supply into the LED string 100a is possible, but the LED string 100a is supplied by the capacitor 41 alone. From t2 to t3 the supply voltage is high enough to operate some LED segments. Both the rectifier unit 30c and the capacitor 41 deliver power to the LED string 100a by injecting the currents into the appropriate taps, i.e. power is delivered to the different ports of the LED light source. At t3 the supply voltage level equals the voltage level of the discharged capacitor 41 so that recharging of the capacitor 41 starts. The time period t3 to t4 includes a sequence of intervals where the capacitor 41 is charged from the rectifier unit 30c and either rectifier unit 30c or the capacitors 41 delivers power to the LED string 100a. At t4 the capacitor 41 charges. From t4 to t6 the rectifier unit 30c supplies the LED string 100a and the capacitor 41 is unloaded now. At t5, although the supply current is quite flat here, there is a step in the LED power, this being an indication that the supply current is now injected into the different (lower) tap because the voltage levels from the rectifier unit 30c does no longer allow for feeding into the longest LED string, i.e. into the input power port with the highest voltage. From t6 to t7 the rectifier unit 30c supplies some LED segments and also the capacitor 41 supplies some LED segments, too.

It should be noted that the simulated waveforms shown in FIG. 5 have a quite low efficiency and a too high optical flicker. It is to be understood as a very simple example, showing that the dual power-input driver can supply a single LED string from the rectifier unit and from a capacitor. The waveform is intentionally designed to have a high third and fifth component, as this will increase the available current for angles smaller than 60° and larger than 120°, while reducing the current near the peak (60° ... 120°). These current modulations help to produce more light from the shorter LED string at lower supply voltages without creating too many harmonics or too low power factor. Any difference between supply voltage and capacitor or LED tap voltage is dissipated into heat via the current source 91 and/or 131.

The power factor can be set to virtually any value. With the input current waveform used above (i.e. the control signal for 91), a power factor of 0.95 is achieved.

The flexibility in driving the LED string from multiple power sources is also beneficial for dimming. Preferably, for leading edge dimming (TRIAC dimmimg), at least some of the switches in the second switching unit 70 are realized bidirectional to charge the capacitor 41 through the load 100 to have a limited inrush without to much impact on efficiency.

Figure 6:
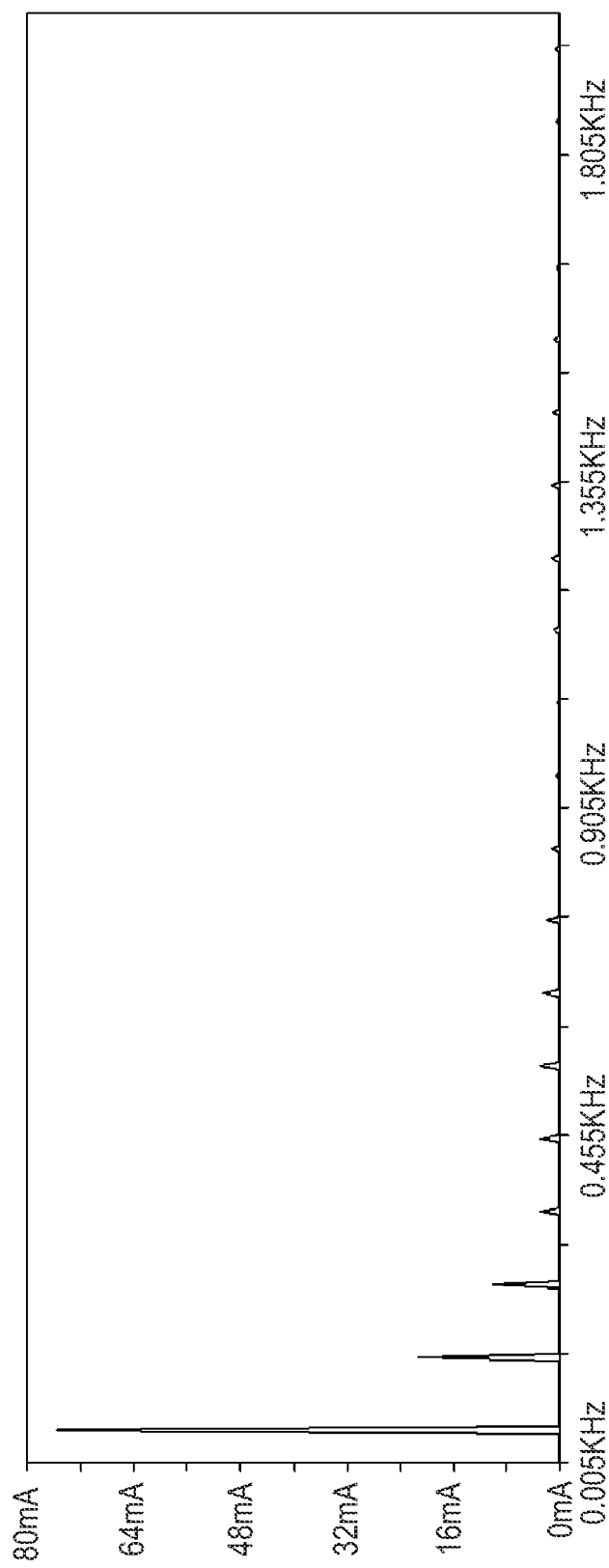
FIG. 6 shows a diagram illustrating the spectrum of the supply current of a driver device according to the present invention.

The spectrum illustrated in FIG. 6 shows only very little distortion.

When later adding a bleeder circuit (to allow a current path near the zero crossing of the supply voltage, in order to supply auxiliary power and timing information to the dimmer), this will further reduce the harmonics.

Compared to a standard TLD driver device, according to the present invention the amount of power given to the load can be controlled. In particular, the power for the load is drawn from either the rectifier unit, i.e. more or less directly from the input supply (e.g. from a mains power source), and/or the capacitor. Further, the recharge of the capacitor off the rectifier unit can be controlled and recharging the capacitor via power transported through the load is possible.

As explained above important elements of the present invention include to have a multiple junction load, e.g. an LED light source, wherein the load is arranged such that there are multiple (at least two) ports to deliver power to the load, wherein these at least two ports may share one common pin, so in total there are at least three pins (input 1, input 2, common output), or may be decoupled from each other such that there are four pins (input 1, output 1, input 2, output 2). Referring to the implementation in FIG. 4, the load has 5 pins. Due to the unidirectional structure used in this example, there are 4 inputs and 1 output. With a different driver device (e.g. including bidirectional switches), some of these pins can be used are input and/or output. The proposed driver device preferably includes a supply input, a storage (e.g. capacitor), transfer means (including means to limit the amount of current, voltage or power delivered) to transfer power from the supply input and/or the capacitor to the first and/or second power port of the load. Preferably, also a control circuitry balancing the total power delivered to the load via the at least two ports such that the load output (e.g. light output) is stable regardless of the currently selected power input.

While the two power ports of the load mentioned above are the required minimum, a practical implementation will have more inputs to deliver power to the load at various voltage levels. As an example, an implementation for use in Europe might have a maximum LED voltage level around 280V, divided into four segments, so power input is possible with a supply voltage of more than 70V, more than 140V, more than 210V, and more than 280V. In contrast to an TLD implementation, the part of the LED string currently no being powered from a first power source (e.g. the mains) is not shunted or bypassed but is allowed to receive power from a second power source (e.g. the capacitor). To enable this, there are multiple inputs (i.e. from the rectifier unit/supply input and from the capacitor) to the transfer means in the driver. This might be seen as a key difference to the TLD, where ultimately the rectifier unit and the capacitor share common inputs into the switched LED string, such that it is not possible to deliver the two powers at different voltage levels to the LED light source at the same time.

The capacitor has to be recharged from the rectifier unit from time to time, preferably during each half wave of the supply voltage. In addition to this, the capacitor can also be recharged via the load and the transfer means, meaning that it receives power via the port that is normally used to deliver power to the load. Hence, one port of the load is used a power input while the other is used as power output. When selecting the appropriate voltage levels, a portion of the input power will be processed (translated into light and heat) by the load while the remaining portion is delivered to the capacitor and recharges it. This enables further manipulation of the electrical input waveform. Normally, the recharging of the capacitor would occur as soon as the supply voltage is higher than the voltage level the capacitor has been discharged to previously. When (partly) recharging via the load, this recharging current can be moved towards a different point in time.

In contrast to the rectifier unit that delivers energy to the arrangement, the capacitor can only store energy and act as a power source for a limited time interval. During discharging the capacitor, its voltage will decrease. Due to the multiple power input ports of the load at preferably different voltage levels, the capacitor can still deliver power to the load as long as the voltage is higher than the lower input voltage level of the load. In parallel to this, the load can also receive power from the rectifier unit at a different voltage or power level. Thus, the possibility to deliver power from any of the power inputs (rectifier unit, capacitor) to the load based on the electrical input and optical output waveform requirement is given. Any power delivered to the load will contribute to the load output while only the current directly transferred off the rectifier unit to the load and the recharging current of the capacitor contribute to the electrical input waveform.

As a result, the driver device according to the present invention offers better flexibility to shape the electrical input waveform and hence enables lower harmonics and THD and higher power factor with reduced impact on the light output.

The storage unit is preferably implemented by a capacitor (or multiple capacitors) as shown in the embodiments, but other elements for storing electrical energy may be used instead, such as an accumulator or inductive energy storage means.

The rectifier unit shown in the embodiments is not an essential element of the proposed driver device, but is only provided if the supply voltage can not be directly used to drive the load and to charge the storage unit.

The load preferably comprises an LED assembly, but the proposed driver device can also be used for driving other loads having more than two terminals, where a first part of the load can be driven by a first power source and the second part can be driven by a second power source (and where the parts and the power sources driving the respective parts may be subject to changes). Such other loads may include other light assemblies, electronic components, audio elements, etc.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A driver device for driving a load in particular an LED assembly comprising two or more LEDs, said driver device comprising:

supply terminals configured to receive a supply voltage, load terminals configured to couple a load to said driver device, a first switching unit coupled between said supply terminals and said load terminals and configured to switchably provide first electrical energy from said supply terminals to one or more of said load terminals, a storage unit configured to store second electrical energy received at said supply terminals, a coupling unit coupled between said supply terminals and said storage unit and configured to controllably provide the second electrical energy from said supply terminals to said storage unit, a second switching unit coupled between said storage unit and said load terminals and configured to switchably provide the second electrical energy stored in said storage unit to one or more of said load terminals, and a control unit configured to control said coupling unit and said first and second switching units to drive the load such that for at least some time the first switching unit is connected to at least a first one of the load terminals to couple the first electrical energy from the supply terminals to the load at a same time as the second switching unit is connected to least a second one of the load terminals to couple the second electrical energy from the second storage unit to the load.

2. The driver device as claimed in claim 1, wherein said second switching unit is configured to switchably provide the second electrical energy from one or more of said load terminals to said storage unit.

3. The driver device as claimed in claim 2, wherein said second switching unit comprises bidirectional switches.

4. The driver device as claimed in claim 1, wherein at least one of said coupling unit, said first switching unit and second switching unit comprises a limiting device configured to limit at least one of the current, voltage and electrical power provided through the respective unit.

5. The driver device as claimed in claim 4, wherein said limiting means comprises a current source for limiting the current.

6. The driver device as claimed in claim 1, wherein said control unit is configured to control said first and second switching units to switchably provide the first and second electrical energy to said load according to one or more predetermined criteria selected from a group consisting of efficiency, power factor, current waveform, homogenous stress of the different segments within the load and flatness in light output in case of the load including a light unit.

7. The driver device as claimed in claim 1, wherein said at least one of the first switching unit and the second switching unit comprises current measuring elements configured to measure the current provided through an associated switching element of the respective switching unit, and wherein said control unit is configured to control said first and second switching units to switchably provide electrical energy to said load to balance a total power and a power distribution in the load.

8. The driver device as claimed in claim 1, wherein said storage unit comprises two storage output terminals and wherein said second switching unit comprises switching elements for independently switching said two storage output terminals to two load terminals.

9. The driver device as claimed in claim 1, further comprising a rectifier unit coupled to said supply terminals for rectifying a received AC supply voltage.

10. The driver device as claimed in claim 9, wherein said rectifier unit and said storage unit have a common reference terminal coupled to one of said load terminals.

11. The driver device as claimed in claim 9, wherein said rectifier unit comprises two rectifier output terminals and wherein said second switching unit comprises switching elements for independently switching said two rectifier output terminals to two load terminals.

12. The driver device as claimed in claim 9, wherein said control unit is configured to control said first and second switching units such that the first electrical energy is provided from said supply terminals to a first part of said load and that the second electrical energy is provided from said storage unit to a second part of said load, and that the providing of electrical energy to said first and second parts is adapted according to the amount of electrical power that is currently taken from the supply terminals.

13. The driver device as claimed in claim 1, wherein said storage unit includes a capacitive storage unit.

14. The driver device of claim 1, wherein the control unit is configured to control said coupling unit and said first and second switching units such that at least a first part of the load is driven by the first electrical energy from the supply terminals during at least a first portion of each of a plurality of cycles of the supply voltage, and at least a second part of the load is driven by the second electrical energy from the storage unit during each of the same plurality of cycles of the supply voltage.

15. The driver device of claim 1, wherein the control unit is configured to control said coupling unit and said first and second switching units to:
    couple the second electrical energy from the storage unit to a first part of the load and to a second part of the load at a beginning of one of the cycles while the supply voltage is less than a first value,
    when the supply voltage becomes greater than the first value in the one of the cycles, disconnect the second electrical energy from the first part of the load and couple the first electrical energy from the supply terminals to the first part of the load while continuing to couple the second electrical energy from the storage unit to the second part of the load, and
    when the supply voltage becomes greater than a second value in the one of the cycles, disconnect the second electrical energy from the second part of the load and couple the first electrical energy from the supply terminals to the second part of the load.

16. A method for driving a load, said method comprising the steps of:
    receiving a supply voltage,
    switchably providing first electrical energy from said supply terminals to one or more of a plurality of load terminals,
    storing second electrical energy received through said supply voltage in a storage unit,
    controllably providing the second electrical energy to said storage unit,
    switchably providing the second electrical energy stored in said storage unit to one or more of said load terminals, and
    selectively coupling the first electrical energy from the supply terminals and the second electrical energy from the storage unit to the load terminals such that at least a first part of the load is driven by the first electrical energy from the supply terminals during at least a first portion of each of a plurality of cycles of the supply voltage, and at least a second part of the load is driven by the second electrical energy from the storage unit during each of the same plurality of cycles of the supply voltage.

17. The method of claim 16, wherein selectively coupling the first electrical energy from the supply terminals and the second electrical energy from the storage unit to the load terminals such that at least a first part of the load is driven by the first electrical energy from the supply terminals during at least a first portion of each of a plurality of cycles of the supply voltage, and at least a second part of the load is driven by the second electrical energy from the storage unit during each of the same plurality of cycles of the supply voltage includes:
    coupling the second electrical energy from the storage unit to the first part of the load and the second part of the load at a beginning of one of the cycles while the supply voltage is less than a first value,
    when the supply voltage becomes greater than the first value in the one of the cycles, disconnecting the second electrical energy from the first part of the load and coupling the first electrical energy from the supply terminals to the first part of the load while continuing to couple the second electrical energy from the storage unit to the second part of the load, and
    when the supply voltage becomes greater than the a second value in the one of the cycles, disconnecting the second electrical energy from the second part of the load and coupling the first electrical energy from the supply terminals to the second part of the load.

18. A lighting apparatus comprising:
    a light unit, and
    a driver device coupled to said light unit and configured to drive said fight unit, wherein the driver device comprises:
        supply terminals for receiving a supply voltage (VS),
        load terminals coupling the light unit to said driver device,
        a first switching unit coupled between said supply terminals and said load terminals and configured to switchably provide first electrical energy from said supply terminals to one or more of said load terminals to drive the light unit,
        a storage unit configured to store second electrical energy received at said supply terminals,
        a coupling unit coupled between said supply terminals and said storage unit and configured to controllably provide the second electrical energy from said supply terminals to said storage unit
        a second switching unit coupled between said storage unit and said load terminals and configured to switchably provide the second electrical energy stored in said storage unit to one or more of said load terminals, and
        a control unit configured to control said coupling unit and said first and second switching units such that for at least some time the first switching unit is connected to at least a first one of the load terminals to couple the first electrical energy from the supply terminals to the light unit at a same time as the second switching unit is connected to least a second one of the load terminals to couple the second electrical energy from the storage unit to the light unit.

19. The lighting apparatus of claim 18, wherein the control unit is configured to control said coupling unit and said first and second switching units such that at least a first lighting device of the light unit is driven by the first electrical energy from the supply terminals during at least a first portion of each of a plurality of cycles of the supply voltage, and at least a second lighting device of the light unit is driven by the second electrical energy from the storage unit during each of the same plurality of cycles of the supply voltage.

20. The lighting apparatus of claim 18, wherein the control unit is configured to control said first and second switching units such that the first electrical energy is provided from said supply terminals to a first lighting device of the light unit and that the second electrical energy is provided from said storage unit to a second lighting device of the light unit, and that the providing of electrical energy to said first and second lighting devices is controlled according to the amount of electrical power that is currently taken from the supply terminals.

* * * * *